United States Patent [19]

Moorhead

[11] Patent Number: 5,279,736
[45] Date of Patent: Jan. 18, 1994

[54] BEND TYPE SEPARATOR FOR SOLID PARTICLE SEPARATION

[75] Inventor: Robert G. Moorhead, Blairsville, Pa.

[73] Assignee: Krebs Engineers, Menlo Park, Calif.

[21] Appl. No.: 788,264

[22] Filed: Nov. 4, 1991

Related U.S. Application Data

[63] Continuation-in-part of Ser. No. 453,827, Dec. 21, 1989, abandoned, and a continuation-in-part of Ser. No. 587,524, Sept. 24, 1990, said Ser. No. 453,827, Dec. 21, 1989. Continuation-in-part of Ser. No. 343,425, Apr. 26, 1989, Pat. No. 4,981,587, and a continuation-in-part of Ser. No. 246,314, Sept. 13, 1988, said Ser. No. 587,524, Sept. 24, 1990. Continuation of Ser. No. 343,425, Apr. 26, 1989, and a continuation-in-part of Ser. No. 246,314, Sept. 13, 1988, Pat. No. 4,981,587.

[51] Int. Cl.⁵ .......................................... B01D 29/72
[52] U.S. Cl. ................... 210/383; 210/421; 210/456; 162/212; 162/343
[58] Field of Search ............... 210/106, 418, 420, 421, 210/456, 402, 383, 384, 388; 162/208, 209, 212, 213, 216, 343, 373

[56] References Cited

U.S. PATENT DOCUMENTS

| | | | |
|---|---|---|---|
| 4,113,626 | 9/1978 | Detcher | 210/456 |
| 4,120,790 | 10/1978 | Tinker et al. | 210/420 |
| 4,512,880 | 4/1985 | Connolly | 210/420 |
| 4,671,877 | 6/1987 | Godbeer | 210/420 |
| 4,710,296 | 12/1987 | Bradley et al. | 210/420 |
| 4,981,587 | 1/1991 | Moorhead | 210/402 |

*Primary Examiner*—Robert A. Dawson
*Assistant Examiner*—W. L. Walker
*Attorney, Agent, or Firm*—Flehr, Hohbach, Test, Albritton & Herbert

[57] ABSTRACT

Sieve bend for separating particles of differing size in a liquid slurry. The bend structure defines a passage having an inlet end and a discharge end, with a throat of decreasing cross sectional area at the discharge end of the passage, and a sieve screen for receiving slurry flowing from the discharge end of the passage. The throat is formed in part by a movable member, with means for adjusting the position of the movable member to vary the cross sectional area of the throat and means for temporarily moving the movable member to an open position to clear debris from the throat. The sieve screen is mounted in a housing associated with the bend structure, and the housing is vibrated in a resonant manner to dislodge material from the screen. A repulping box is positioned midway along the screen for supplying additional liquid to the slurry as it passes over the screen.

13 Claims, 16 Drawing Sheets

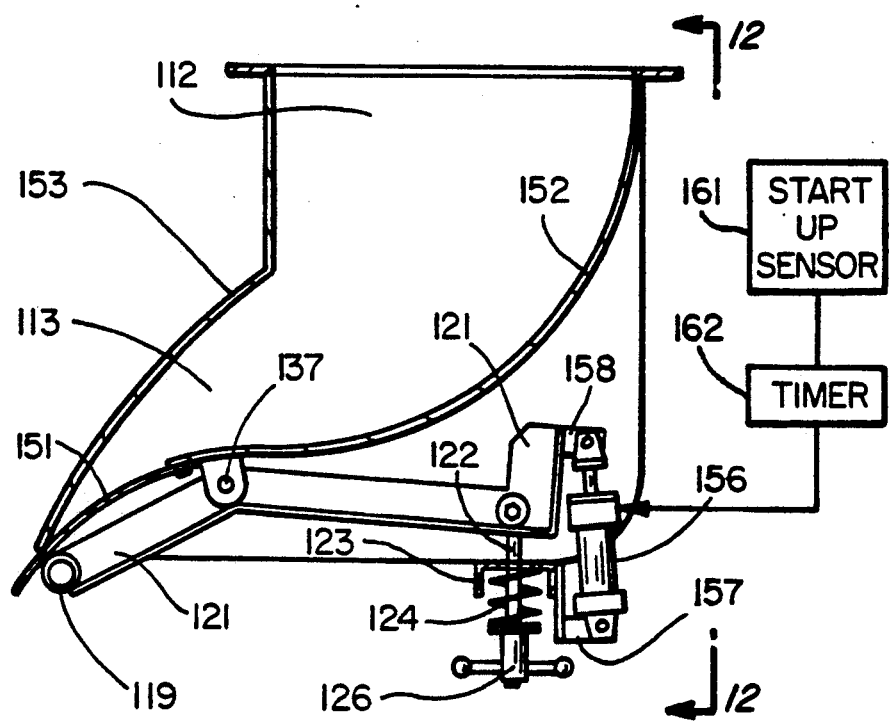
FIG_11
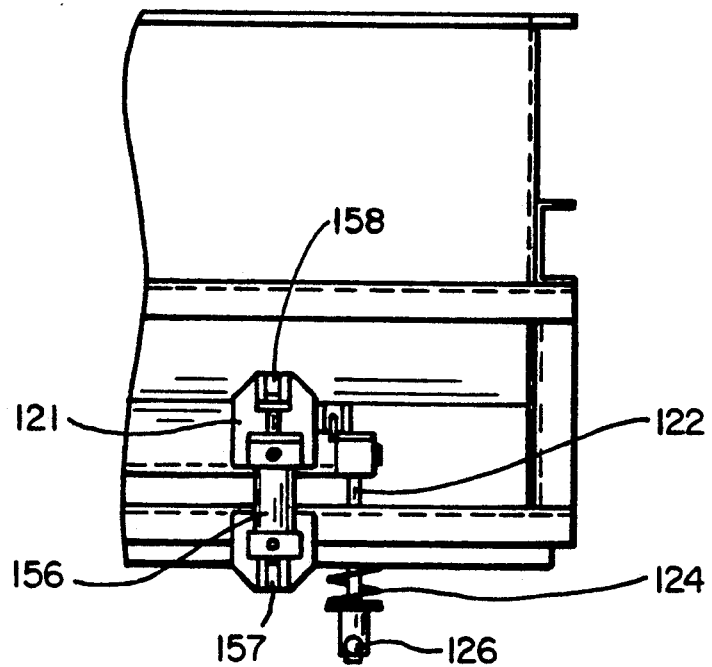
FIG_12

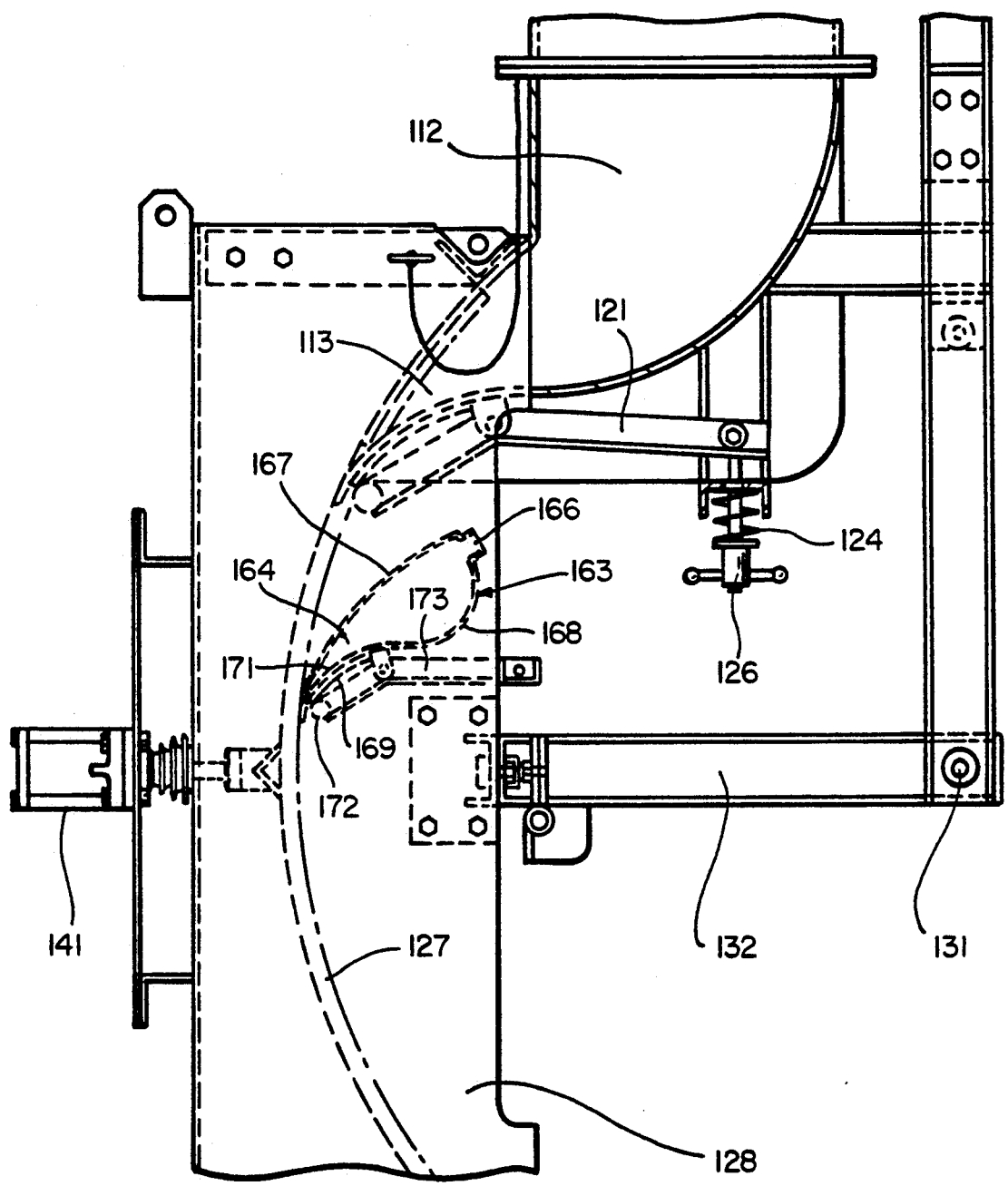
FIG_13

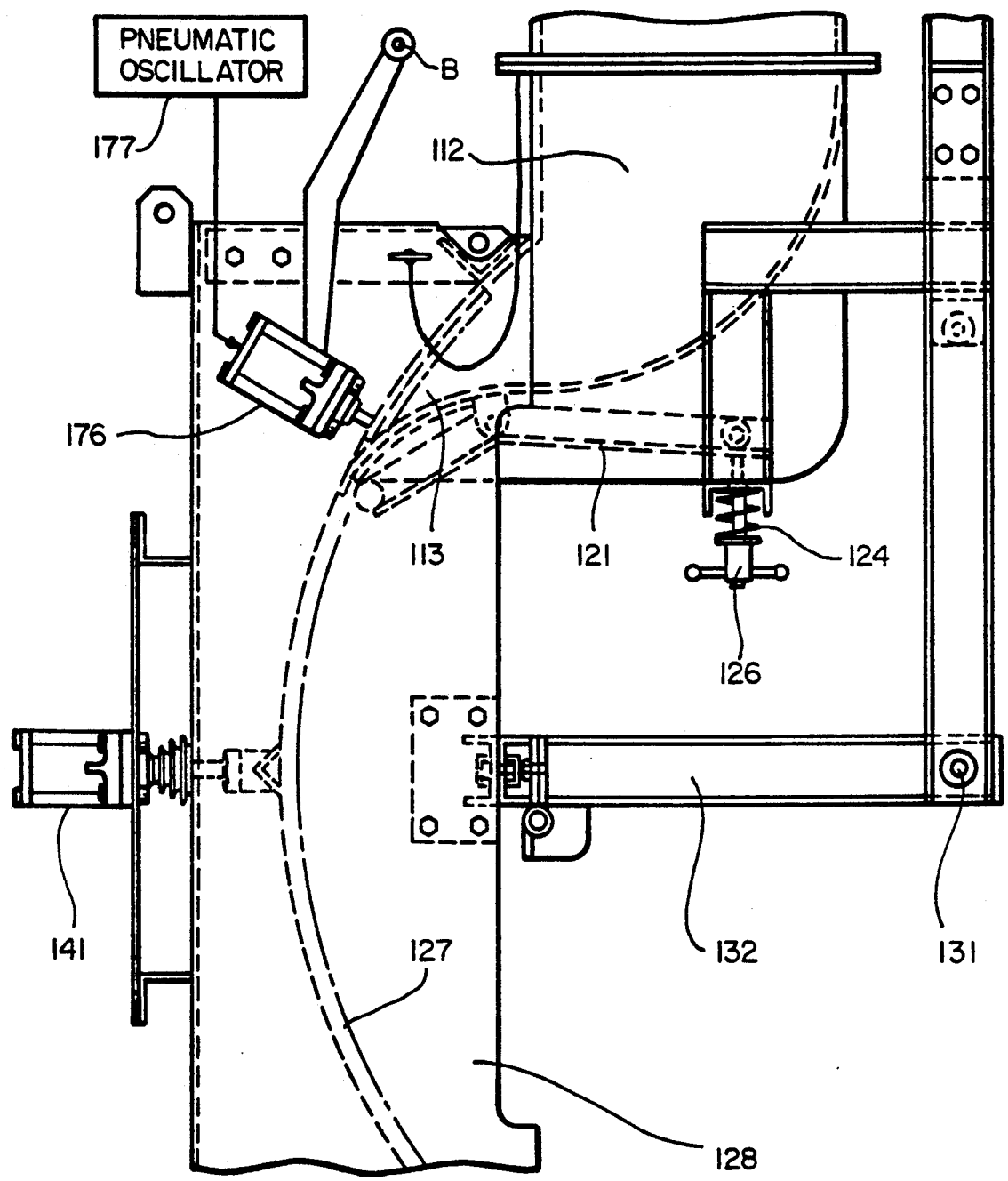
FIG_14

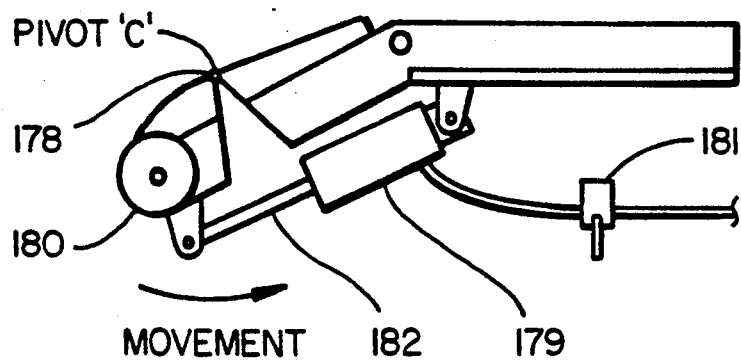
FIG_15
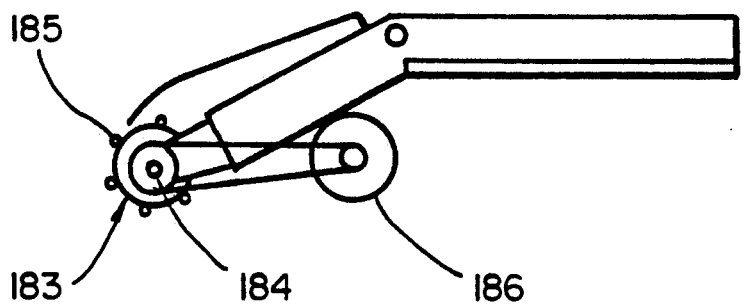
FIG_16
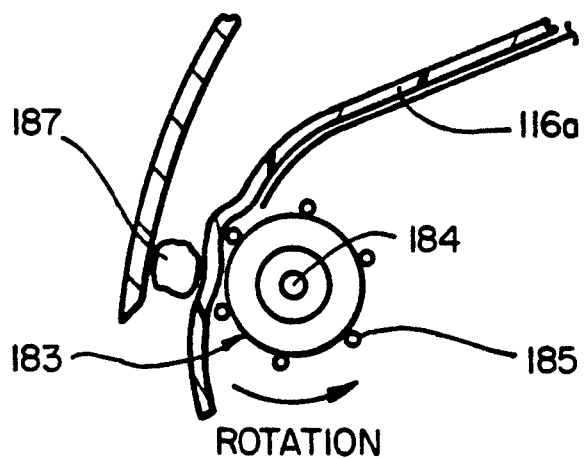
FIG_17

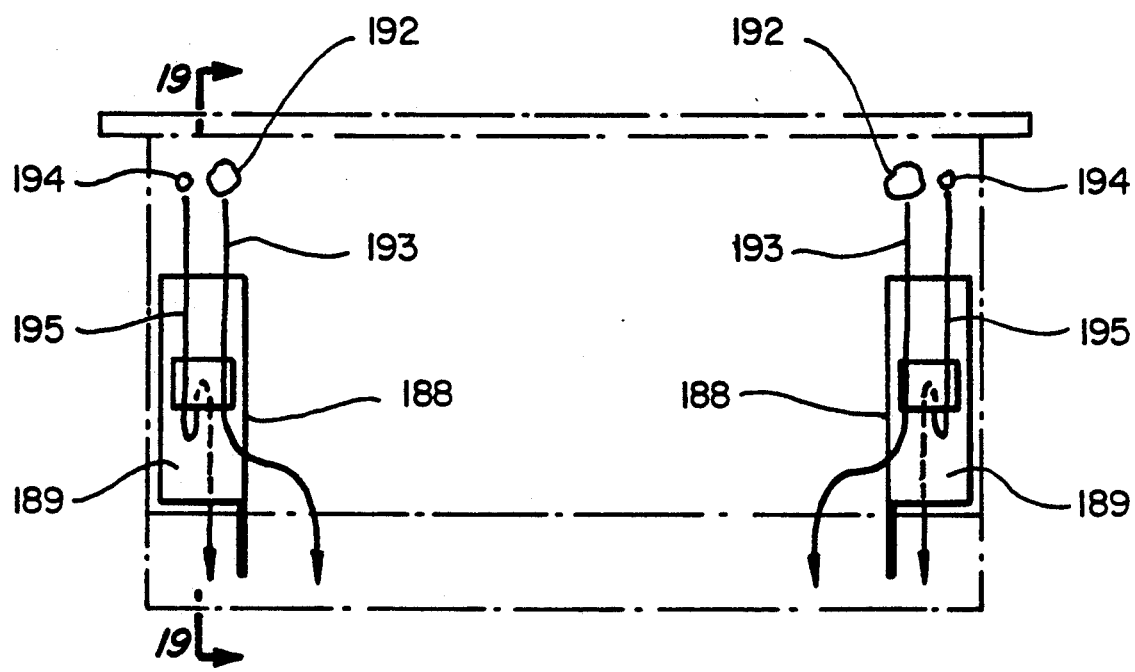
FIG_18
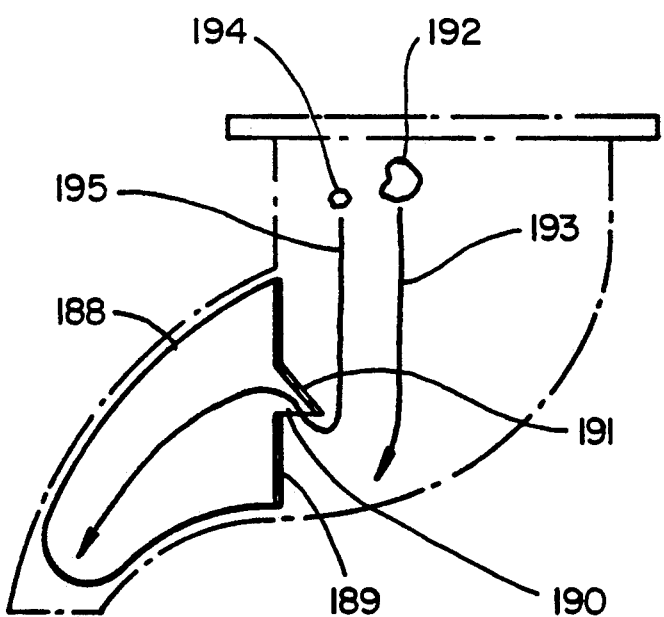
FIG_19

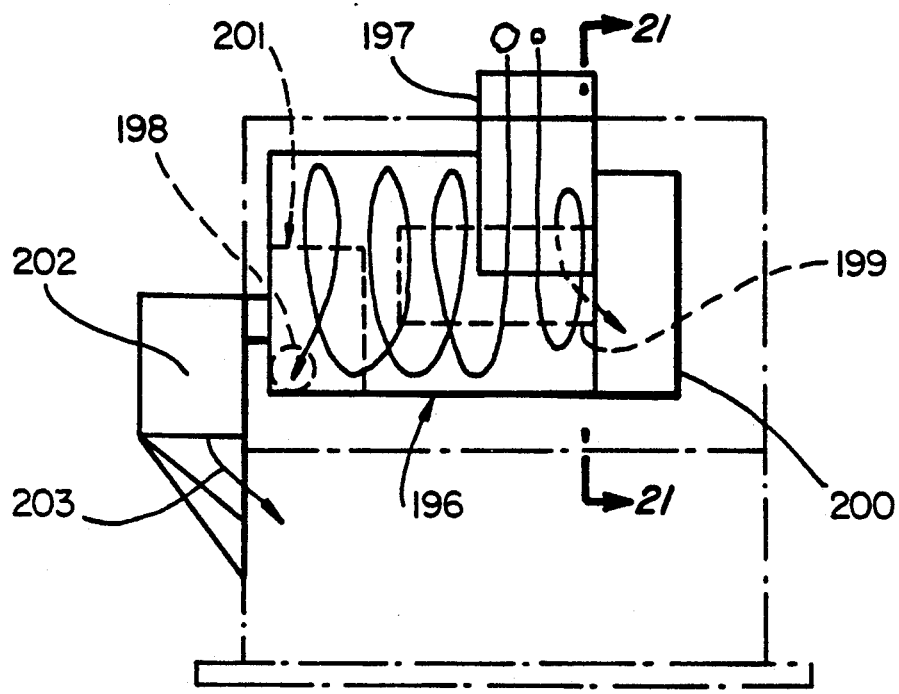
FIG_20
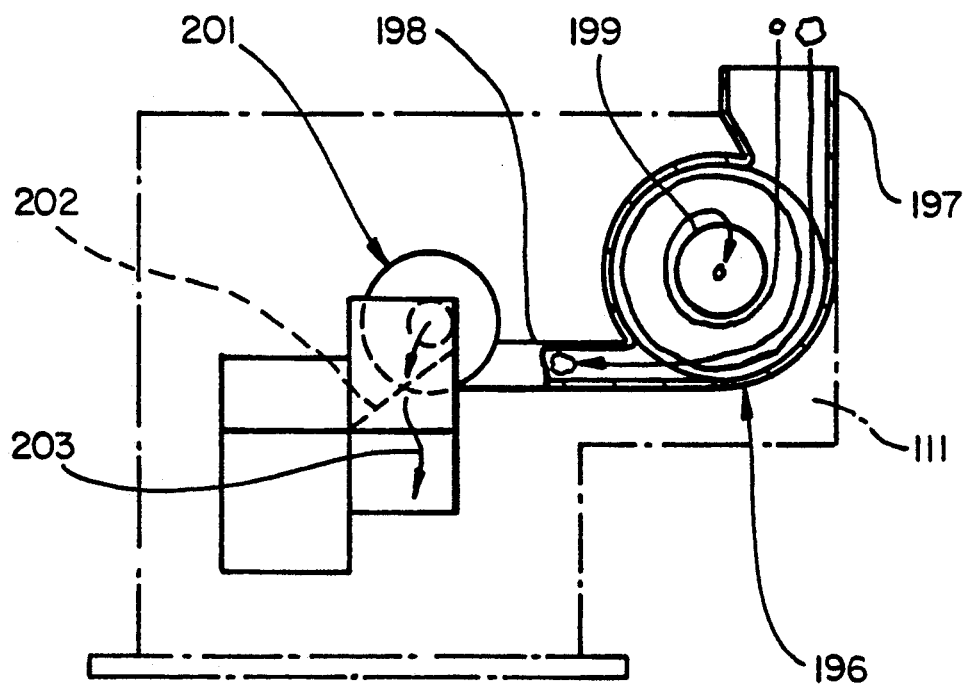
FIG_21

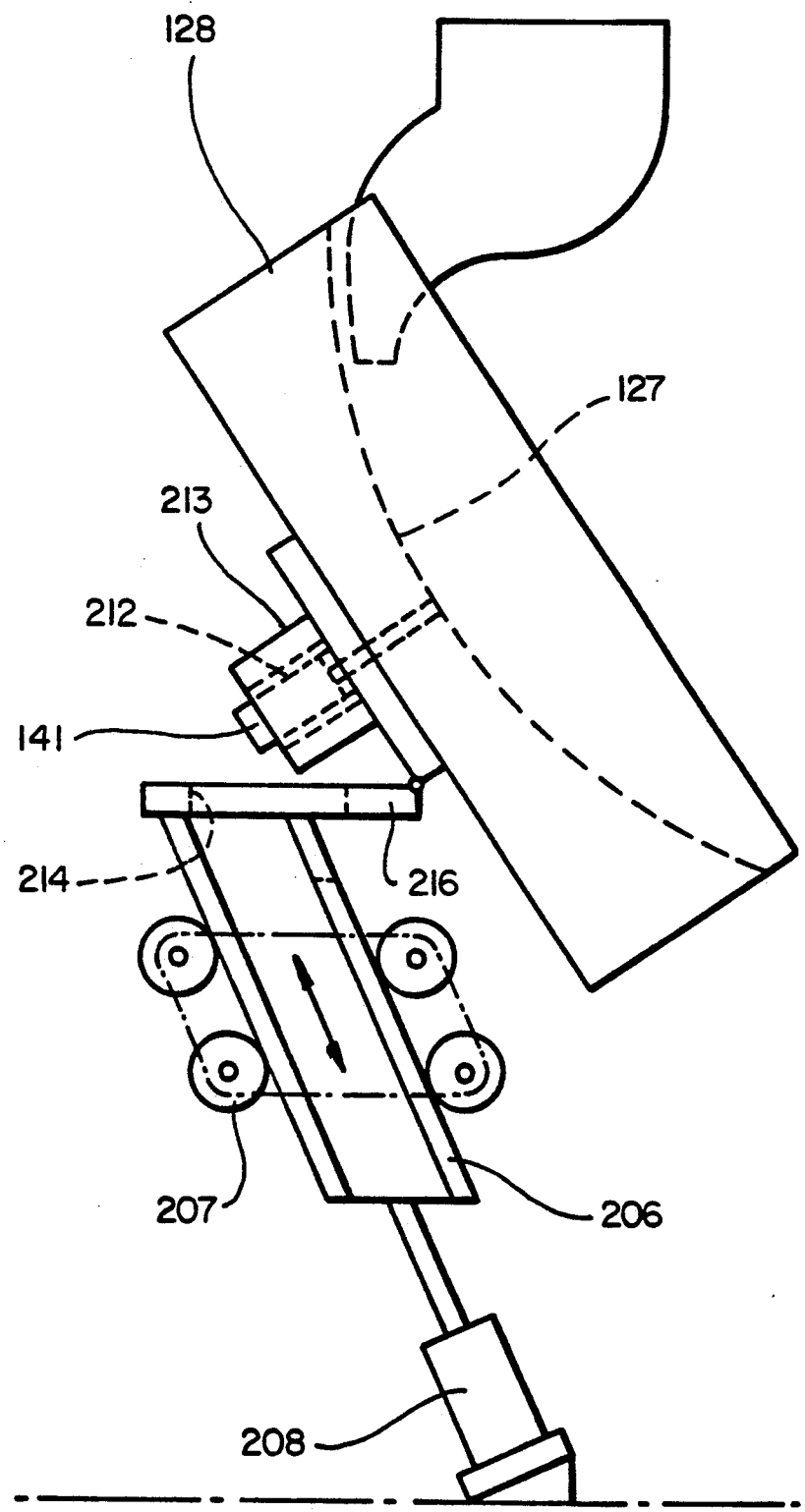
FIG_22

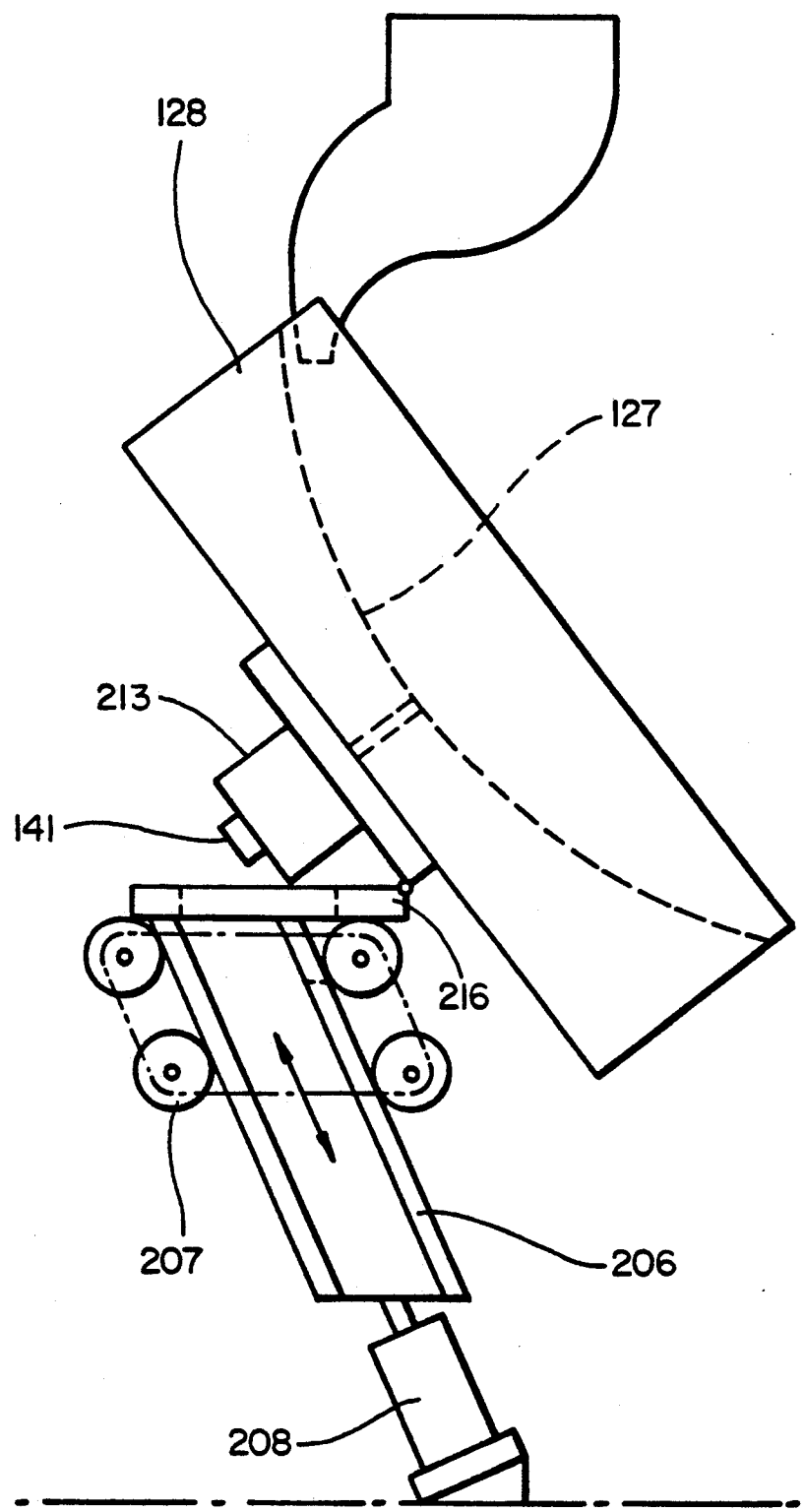
FIG_23

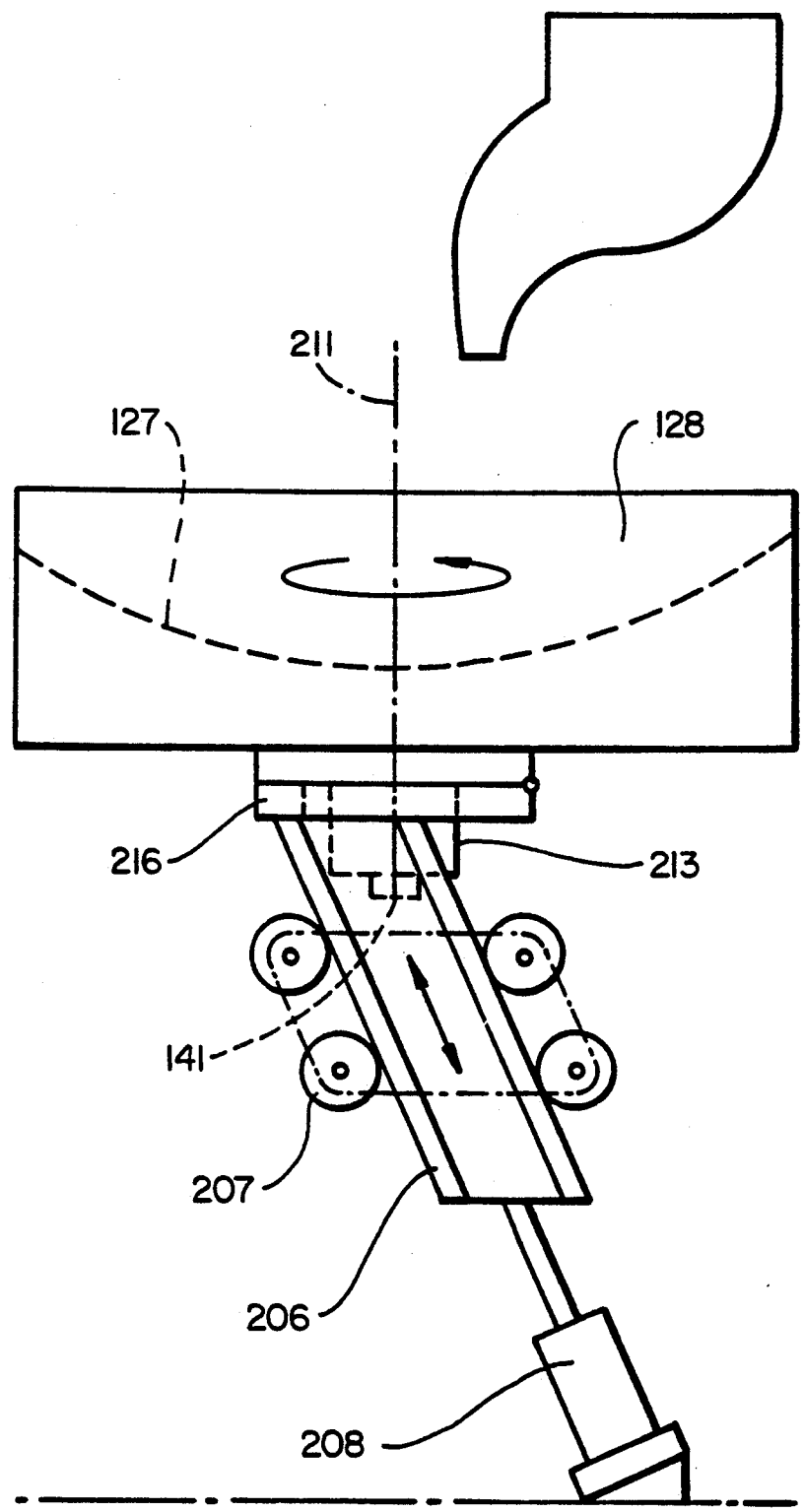
FIG_24

BEND TYPE SEPARATOR FOR SOLID PARTICLE SEPARATION

CROSS-REFERENCE TO RELATED APPLICATIONS

This is a continuation-in-part of Ser. No. 07/453,827, filed Dec. 21, 1989, which is now abandoned, and Ser. No. 07/587,524, filed Sep. 24, 1990 which is now pending. Ser. No. 07/453,827 is a continuation-in-part of Ser. No. 07/343,425, filed Apr. 26, 1989, now abandoned, a continuation-in-part of Ser. No. 07/246,314, now U.S. Pat. No. 4,981,587. Serial No. 07/587,524 is a continuation of Ser. No. 07/343,425, filed Apr. 26, 1989, now abandoned, a continuation-in-part of Ser. No. 07/246,314, filed Sep. 13, 1988 now U.S. Pat. No. 4,981,587.

BACKGROUND OF THE INVENTION

1. Field of the Invention

This invention pertains generally to the construction and operation of sieves of the bend type for the separation and sizing of solid particles dispersed in a liquid medium as a slurry and, more particularly to such apparatus and methods that are applicable to the coal and mineral industry to produce two products, one comprising fine particles and the other coarse particles complying with size and quality specifications.

2. Related Art

Heretofore, various types of separating apparatus, such as sieve bends, and methods have been used for the separation of fine solid particles from a liquid medium in which they are dispersed. Such apparatus includes simple sieve racks, hydrocyclones, sieve bends and other types of apparatus making use of hydraulic separation. The coal industry, for example, makes use of sieve bends for the treatment of coal slurries. For the purpose of producing products which comply with size specifications, special techniques have been employed, such as the use of heavy or magnetic particles intermixed with the particles being subjected to separation. Such apparatus and methods have certain limitations and disadvantages, including difficulty in meeting specifications requiring a particular particle size. Furthermore, they are unable to deal effectively with sulphur or clay which may be attached to some of the particles, particularly the larger ones. In general, it may be said that the coal industry is in need of simple apparatus and methods which will make it possible to produce a product consisting of fine coal particles which comply with size specifications and are substantially free of contaminants such as sulphur.

SUMMARY OF THE INVENTION

The invention provides apparatus for separating solid particles from a liquid slurry in which a bend structure defines a passage having an inlet end and a discharge end, with a throat of decreasing cross sectional area at the discharge end of the passage, and a sieve screen for receiving slurry flowing from the discharge end of the passage. The throat is formed in part by a movable member, with means for adjusting the position of the movable member to vary the cross sectional area of the throat and means for temporarily moving the movable member to an open position to clear debris from the throat. The sieve screen is mounted in a housing associated with the bend structure, and means is provided for vibrating the housing in a resonant manner to dislodge material from the screen. A repulping box is positioned midway along the screen for supplying additional liquid to the slurry as it passes over the screen.

BRIEF DESCRIPTION OF THE DRAWINGS

FIG. 11 is a fragmentary sectional view of another embodiment of a sieve bend according to the invention.

FIG. 12 is a cross-sectional view taken along line 12—12 in FIG. 11.

FIGS. 13 and 14 are fragmentary sectional views of additional embodiments of a sieve bend according to the invention.

FIGS. 15 and 16 are fragmentary side elevational views of further embodiments of a sieve bend according to the invention.

FIG. 17 is a fragmentary cross-sectional view illustrating the operation of the embodiment of FIG. 16.

FIG. 18 is a fragmentary front elevational view of another embodiment of a sieve bend according to the invention.

FIG. 19 is a cross-sectional view taken along line 19—19 in FIG. 18.

FIG. 20 is a fragmentary front elevational view, somewhat schematic, of another embodiment of particle separating apparatus according to the invention.

FIG. 21 is a cross-sectional view taken along line 21—21 in FIG. 20.

FIG. 22 is a fragmentary side elevational view of another embodiment of a sieve bend according to the invention.

FIGS. 23 and 24 are operational views of the embodiment of FIG. 22.

DETAILED DESCRIPTION

Figure 1:
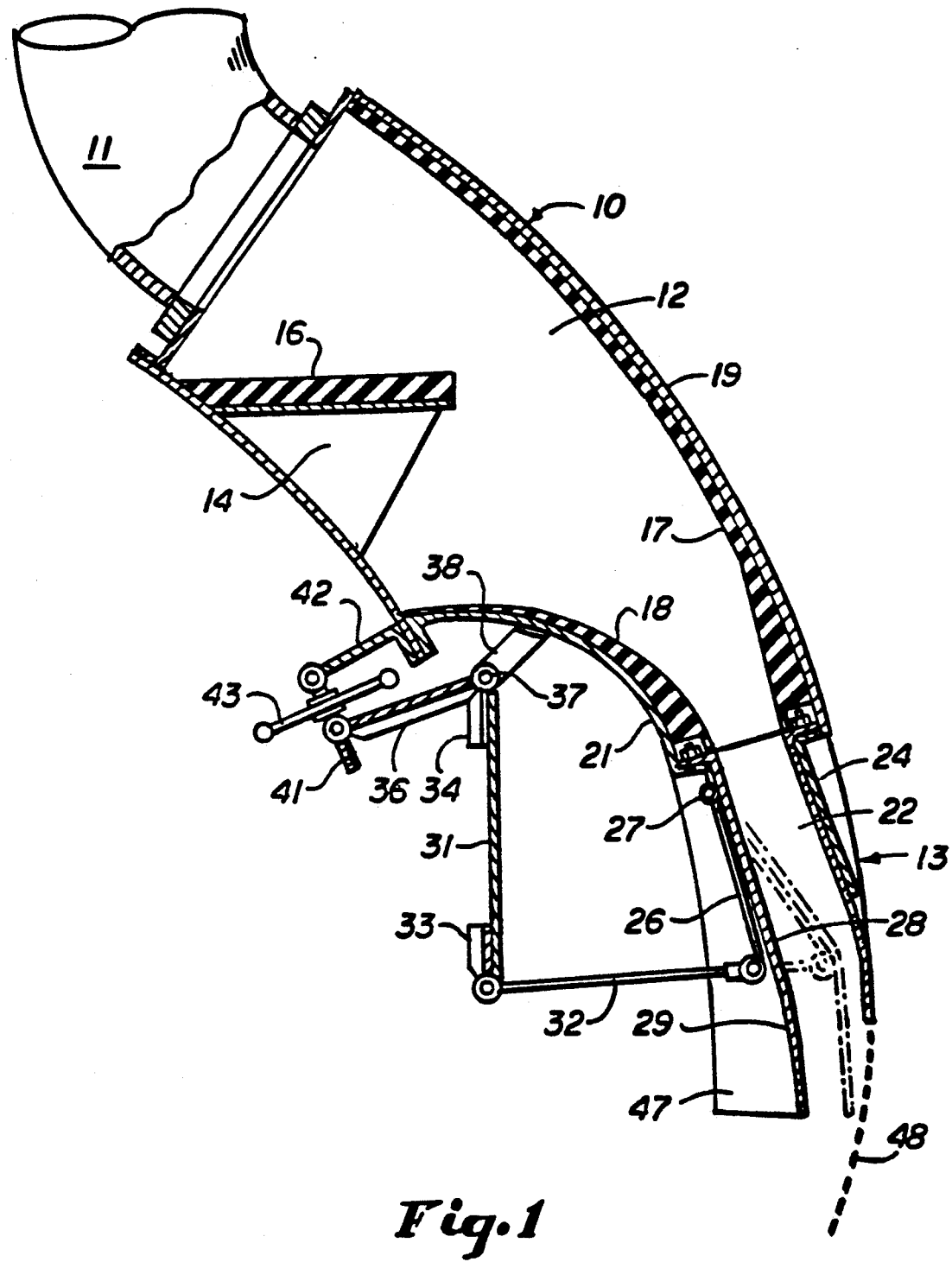
FIG. 1 is a cross-sectional view of one embodiment of a sieve bend headbox incorporating the invention.

The embodiment illustrated in FIG. 1 includes a headbox 10 which has its upper inlet end connected to the slurry supply conduit 11. As it appears in cross section, the headbox provides a flow passage 12 and has a throat 13 at its lower end. The side walls are laterally spaced apart (as for example, to provide a lateral dimension of between 24 and 72 inches). In normal operation, slurry or like feed material is supplied by suitable pumping or gravity flow means to the conduit 11 and sufficient slurry is introduced into the headbox to maintain a level somewhat below the level of the overflow opening. The headbox is so constructed that the passage way 12 is of gradually reduced cross sectional flow area for its lower portion. The upper portion of the headbox is shown provided with a shelf or shoulder 14, which is shown provided with a wear resistant facing 16 of resilient material, such as synthetic or natural rubber. Similar linings 17 and 18 are provided for the outer and inner walls 19 and 21.

The throat 13 may be attached to or a part of the lower portion of the headbox. The outer convex side of the passage way 22 is defined by the fixed wall 24, and the inner side by the plate 26. A pivot 27 serves to attach the upper edge of the plate 26 with a fixed portion of the headbox, as for example, the lower edge of the headbox as shown in FIG. 1. Thus, the plate 26 may swing between the position shown in FIG. 1 and the position illustrated by dotted lines. Overlying the plate 26, there is a sheet 28 which has its upper margin secured to the lower margin of the wall 21 and its lateral margins secured to the side walls 47 to form a watertight seal between these three margins of sheet 28 and the fixed walls 47 and 21 of the box. The lower portion extends downwardly beyond the lower end of the sheet 26 to form a nip flap 29. This sheet likewise is made of suitable resilient material such as natural or synthetic rubber. The plate 26 is attached to means which serves to adjust its position during operation of the sieve bend. The means employed for this purpose shown in FIG. 1 includes a metal strip 31 which functions as a spring when bent laterally. A member 32 is pivotally attached to the lower portion of the plate 26, and its other end is secured to the member 33, which in turn is secured to the lower end of the spring strip 31. The upper end of the spring strip is shown secured to member 34 which is a part of the member 36. Both members 34 and 36 have a pivotal connection 37 with the supporting bracket 38. The arrangement described above makes possible movements of the plate 26 in one direction or the other and against the spring action of the strip 31.

Manually adjusting means is also provided for plate 26. Thus the wall 21 is provided with a threaded rod 41 which has its upper end attached to the bracket 42. A nut that is a part of the handwheel 43 is threaded upon the rod 41. When the handwheel is turned the member 36 moves relative to the member 42 to bend the leaf spring 31 in one direction or the other. If desired, hydraulic, electric or pneumatic operators may also be used to make these manual adjustments, and coil springs can be used in place of the leaf spring.

The outer wall 24 of the throat is terminated at its lower end at a level above the level of the lower end of wall 47. A sieve assembly 48 or sieve rack is schematically illustrated and has its upper portion attached to the lower end of wall 24. The arrangement and the dimensions are such that the nip flap 29 extends for a substantial distance (e.g., 1½ to 3 inches) alongside the sieve.

Figure 5:
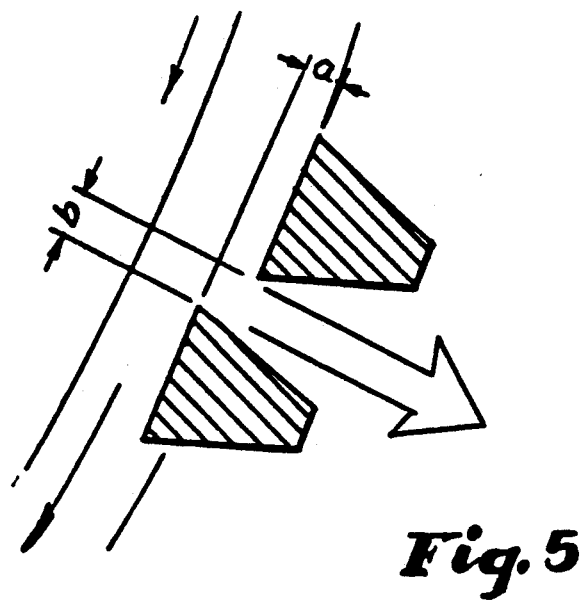
FIG. 5 is a schematic detail showing sieve bars such as are suitable for use with the invention.

A suitable sieve screen assembly may have bars substantially as illustrated in FIG. 5. In this instance, the bars are triangularly shaped as viewed in cross section, and are connected together to form a sieve rack assembly. The slurry flow is directed across the end faces of the bars substantially as indicated by the arrows in FIG. 5. The smaller solid particles of material are of a size that they pass through the slots between the bars. The larger particles have their centroids of mass above the cutting edges of the bars and continue to flow over the sieve bars. In normal operation, a sieve of this character has what is termed a slicing action, and as the slurry passes over the bars, thin slices are removed with the smaller particles passing through the slots between the bars. Wear through usage erodes the surfaces exposed to the flow and can gradually reduce the separating size over time as each bar slices a thinner section of slurry and diverts it into the slot. Schematic FIG. 5 indicates a slice (a) of the slurry flow being diverted through the slot and also (b) the width of the slot. The separation is made by the thickness of the slurry slices diverted by the bars.

The method of operation of a sieve bend constructed as described above is as follows: A slurry containing solid particles, some larger than the smaller particles which cannot pass through the slots of the sieve, is delivered into the upper part of the headbox which supplies the slurry through the throat and over the sieve rack. Adjustment of the slurry level within the upper part of the headbox serves to control the velocity of the slurry as it exits the throat and enters upon the sieve. The outer side of the flow through the throat is defined by the wall 24. Plate 26 forms the inner wall for the throat. Due to the arcuate shaping of the headbox and the flow passage through the same, some centrifugal force is developed which ensures that the slurry will stay in contact with outer wall 24 and the screen 45. Minor changes in flow velocity of slurry through the throat, and through the flow passage between the outer wall 24 and the plate 26 are compensated for by compensating movements of the plate as permitted by the yieldable means formed by the spring 31. Such compensating adjustments occur automatically. The nip flap 29 plays a part in this automatic compensation. The rapid flow of slurry past and in contact with the flap serves to create a reduction in pressure at the interface of the flap and the slurry which serves to cause the flap to press against the flow by atmospheric pressure. This pressure upon the flow is deemed to aid in assuring that the slurry immediately contacts the screen, thus making possible increased operating capacity.

Aside from the automatic or dynamic compensation described above, the apparatus provides a manual adjustment. Thus by turning the wheel 43, the spring strip 31 can be flexed to apply increased force against the plate 26, or to permit the plate to be retracted. Such adjustments may be desirable when there is a substantial change in the character of the slurry or its rate of delivery to the headbox, which results in a substantial change in the velocity of slurry past the nip flap.

Figure 2:
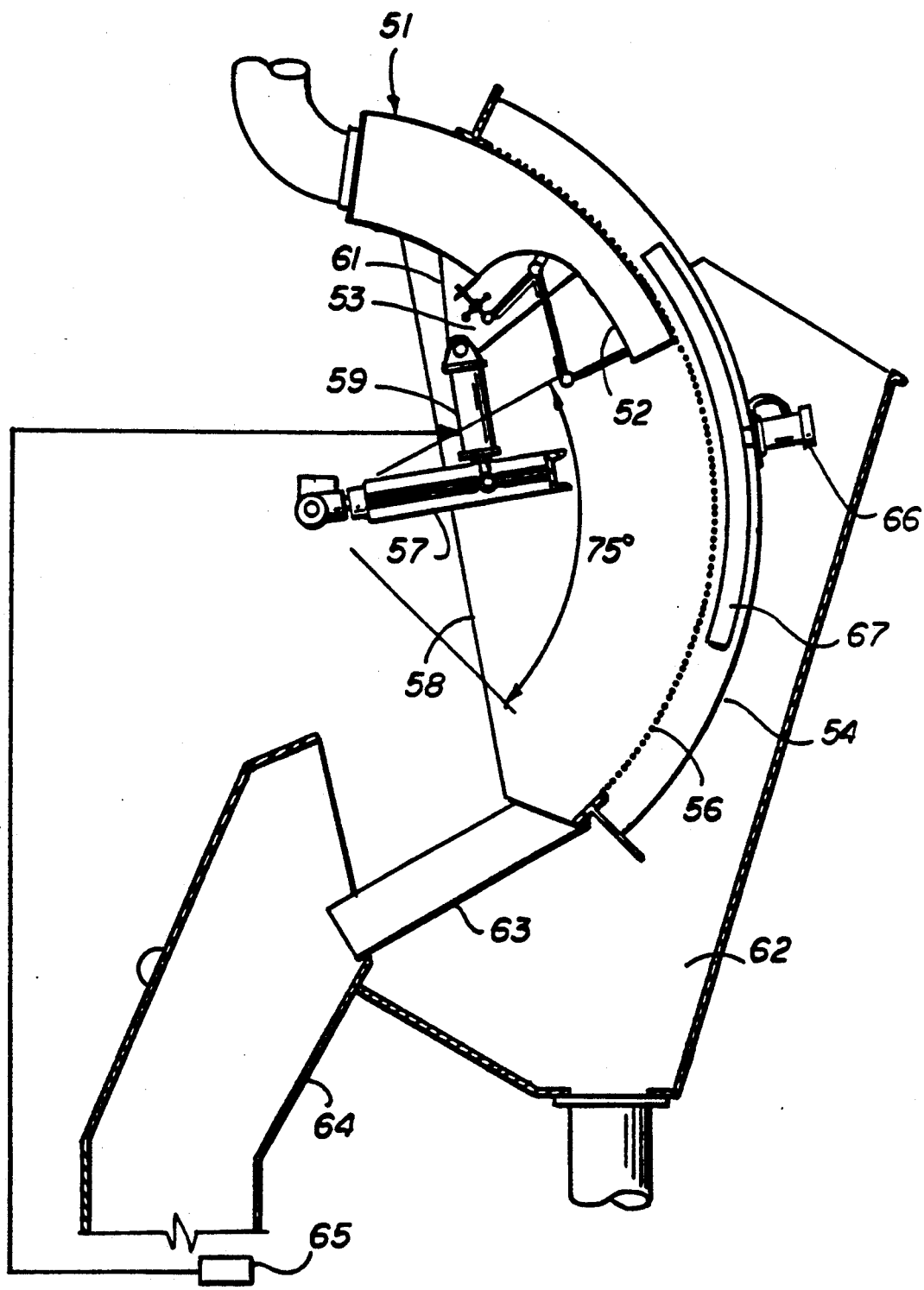
FIG. 2 is a cross-sectional view of a sieve bend which is provided with means for adjusting the exposed area of the sieve rack.

The embodiment of the invention shown in FIG. 2 makes use of a sieve rack which is adjustably mounted upon the bend structure. The bend structure designated by the reference numeral 51 is indicated schematically and has the same control means as in FIG. 1. The throat of the bend is designated by the reference numeral 52, and the control means for the throat is designated by the reference numeral 53. The sieve rack 54 includes a frame which serves to mount the bars of the sieve 56. This assembly is arcuate as illustrated, and its upper portion is carried by and conforms with the curvature of the bend structure. The mounting is such that, when desired, the position of the sieve rack upon the sieve structure may be changed to incrementally expose a new area of the sieve to the flow discharging from the bend as needed to counteract the change in performance (i.e., change in classification numbers) resulting from the gradual dulling of the exposed bars caused by particle abrasion. In other words, the sieve rack may ultimately be shifted during operation to a position shown in FIG. 3 which exposes all or part of the sieve screen to the flow from the throat, whereby the unused portion of the sieve as illustrated in FIG. 2 is now exposed for use. The repositioning of the sieve screen in this manner makes it possible to maintain the classification performance characteristic of a screen for a longer period of time than has heretofore been possible.

Figure 3:
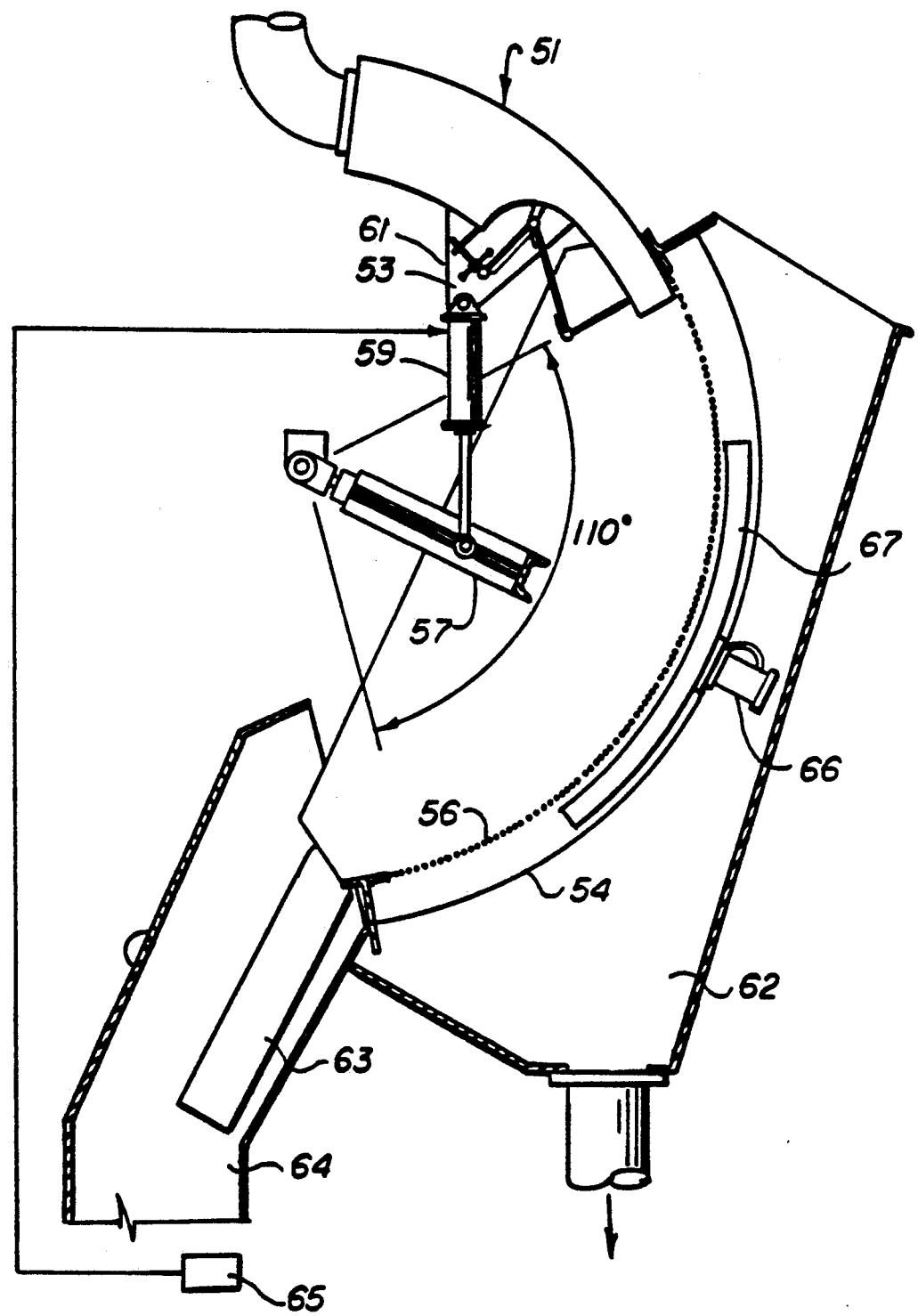
FIG. 3 is a cross-sectional view like FIG. 2 but showing the sieve rack in a different operating position.

After the sizing performance of the apparatus eventually deteriorates below an acceptable level when in the position shown in FIG. 3, the sieve frame and screen must be turned. This is accomplished by rotating the screen frame until completely free of the headbox, spinning it 180 degrees on the screen's center radius and reinserting the previous discharge end behind the headbox to the position shown in FIG. 2. This operation essentially restores the original performance of the device and positions the screen to permit the screen exposure cycle to be repeated.

The means in this instance for shifting the position of the sieve rack includes a member 57, which together with the walls 58 serve to carry the curved sieve rack. For automatic or remote operation, an operator 59 which may be motivated either pneumatically, hydraulically, or electrically, is pivotally connected to member 57, and is carried by the structural member 61. The geometric design of the turning feature permits the screen frame to rotate a full 360° about axis x-x while also permitting the screen and member 57 to pivot about pivot point A through an arc of 20°. The lower end of the structure is provided with separate means for collecting the finer particles which pass through the slots of the sieve bars and the oversized material. Thus, the fine particles are collected in the hopper 62, and the larger sized particles are removed by pan 63 and deposited in receptacle 64.

If desired, shifting of the sieve rack may be carried out from a remote station 65 which is indicated as having controlling connection with the operator 59. For example, assuming that the operator 59 is hydraulically operated, application or discharge of fluid from the operator may be controlled from the station 65. FIG. 3 is similar to FIG. 2 except that it shows the sieve rack shifted to a position where substantially all of the sieve is being supplied with slurry from the bend.

In the embodiments described above, it is desirable to provide means for applying a tapping action to the sieve. Thus as illustrated in FIG. 2 and 3, a device 66, which may be pneumatically operated and is commonly known as a rapper, is attached to member 67 which is in close proximity with sieve screen. Continuous or occasional operation of the device 66 serves to apply tapping action to the sieve bars thus aiding in dislodging any accumulation of material in the screen apertures which otherwise might cause clogging and interfere with efficient operation.

Figure 4:
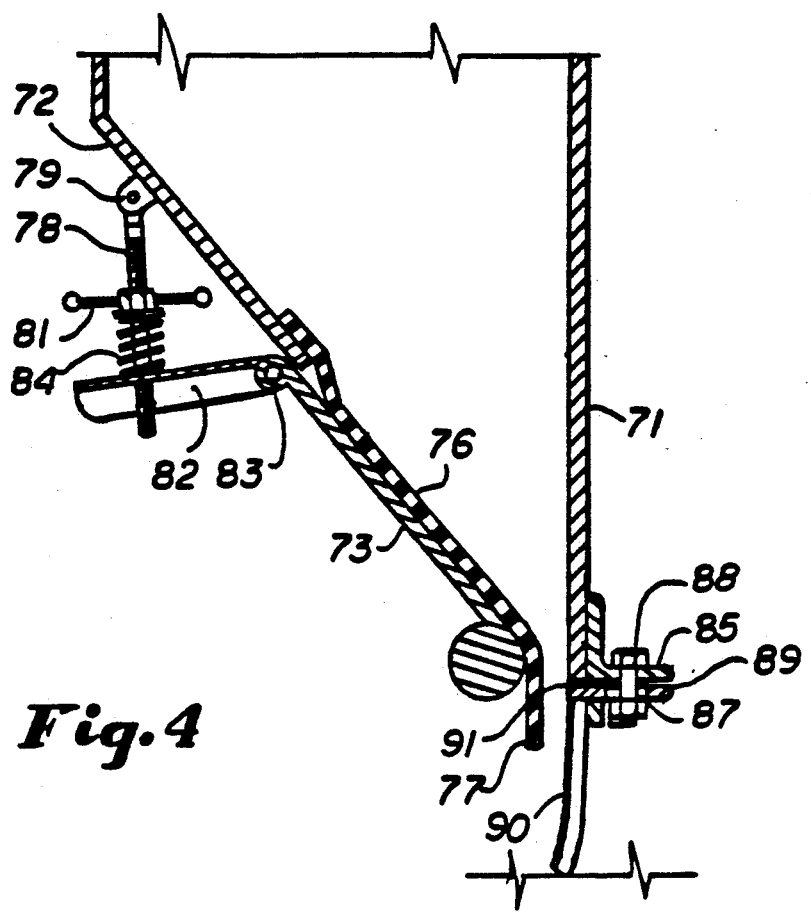
FIG. 4 is a cross-sectional view showing another embodiment of the apparatus.

FIG. 4 illustrates a modified sieve assembly for a sieve bend. This design embodies previous headbox throat features but instead of the sieve screen exposure being variable, this design has a fixed screen. Thus in this instance, vertical and inclined walls 71 and 72 define the lower part of the throat and extend upwards to the height necessary to achieve he desired static head. The control plate 73 extends from the lower edge of the inclined walls 72 and is provided with a facing 76 of resilient material. The lower portion 77 of this facing forms a nip flap. It overlaps the upper portion of the sieve. The adjusting means associated with the plate 73 includes a threaded rod 78 which is pivotally connected at 79 with the wall 72. The handwheel-operated nut 81 has threaded engagement with the rod 78 and the lower end of the rod is connected with the member 82. The upper end of plate 73 is pivotally connected by pivot 83 with a fixed member of the bend structure. Plate 73 is fixed with respect to member 82 and is pivotally connected at 83 with the structure of the bend. A helical spring 84 is positioned between member 82 and the nut of the handwheel 81. Thus during the course of automatic control, the helical spring 84 provides yieldable means serving to urge the plate 73 toward the right as viewed in FIG. 4. However, the thrust of spring 83 can be adjusted by manually turning the handwheel 81. A remote system may also be used to control this manual adjustment as well.

Means is also provided in the embodiment of FIG. 4 for adjusting the alignment of the fixed sieve screen 90 tangent to wall 71. This means includes a flange 85 on the back of wall 71 and an inverted complementary flange 87 on the screen frame which holds the sieve screen. Flange 85 is fastened to flange 87 using machine bolts 88 placed in slotted holes 89. When the screen face 90 is tangent with wall 71, the machine bolts 88 are tightened, compressing the foam seal strip 91 between the upper edge of the screen 86 and the bottom edge of wall 71 and flange 89, and making a slurry-tight seal that prohibits large particles in the feed slurry from leaking through the joint and contaminating the undersize particle flow.

Figure 6:
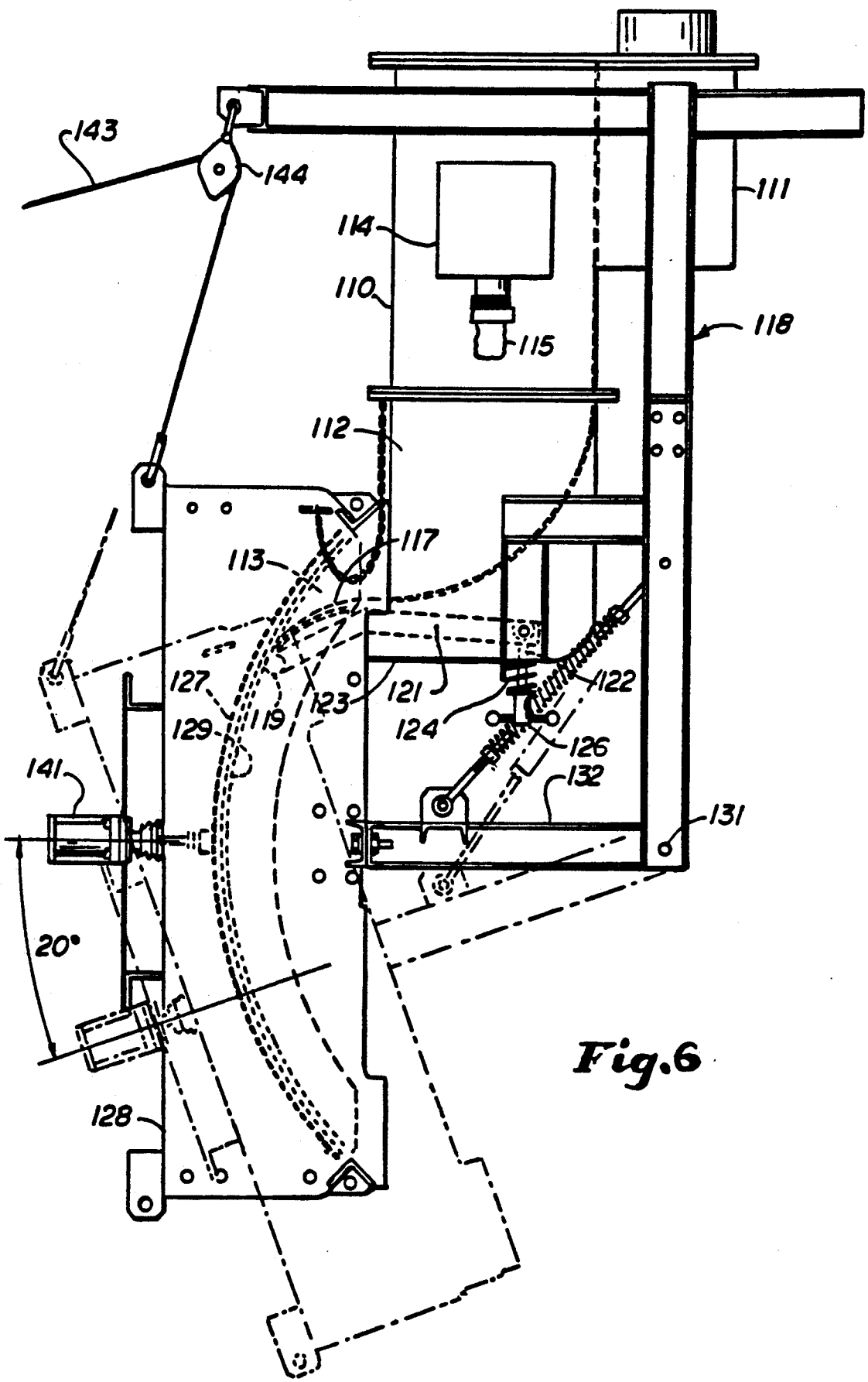
FIG. 6 is a cross-sectional view of another embodiment of a sieve bend incorporating the invention.

The embodiment illustrated in FIG. 6 includes a headbox 110 which has its upper inlet end communicating with the feed box 111. The headbox provides a flow passage 112 which terminates in a throat 113 at its lower end. The width of the passage 112 is shown in FIG. 9. In normal operation, slurry or like feed material is supplied by separate pumping means to the feed box 111 and sufficient slurry is introduced to maintain a level corresponding to the level of the upper edge of the spillover tank 114. Feed slurry in tank 114 is withdrawn through a hose 115 which may be connected to the lower end of the tank 114. The equipment is so constructed that the lower portion of the passageway 112 is of a gradually reduced cross-sectional flow area formed by the throat 113. The throat (FIG. 8) is tapered and the front side of the throat is concave as viewed from the exterior. The throat extends the entire width of the device and may be in sections as shown in FIG. 9.

The front wall of the throat has a plate 116 attached at its upper end to the lower part of the wall by a hinge or pivotal connection 117. The plate 116 is covered on its inner surface with a liner 116a of rubber or other resilient material. The lower part of the resilient material extends from the plate to form a flexible flap 118. It is believed that this flap plays an important part in automatic control. The automatic control include a tubular member or bar 119 which extends for the width of each plate, and is secured to one end of an operating or control arm 121. The free end of this arm is attached to the threaded rod 122, which extends through a stationary member 123 of the machine frame. A helical spring 124 surrounds threaded rod 122 and is seated at one end on the frame member 123. The other end is seated upon a nut 126, which can be turned by hand. When the plate 116 is in a normal position for the average flow of feed material through the throat, the spring 124 is partially compressed. However, static head pressure changes resulting from flow volume variations will cause the plate to be moved from one position to another, as permitted by spring 124.

Figure 7:
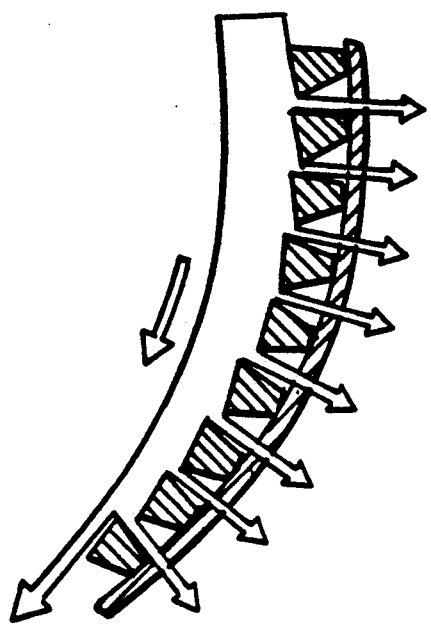
FIG. 7 is a cross-sectional view of a portion of a sieve rack for use in a sieve bend incorporating the invention.
Figure 8:
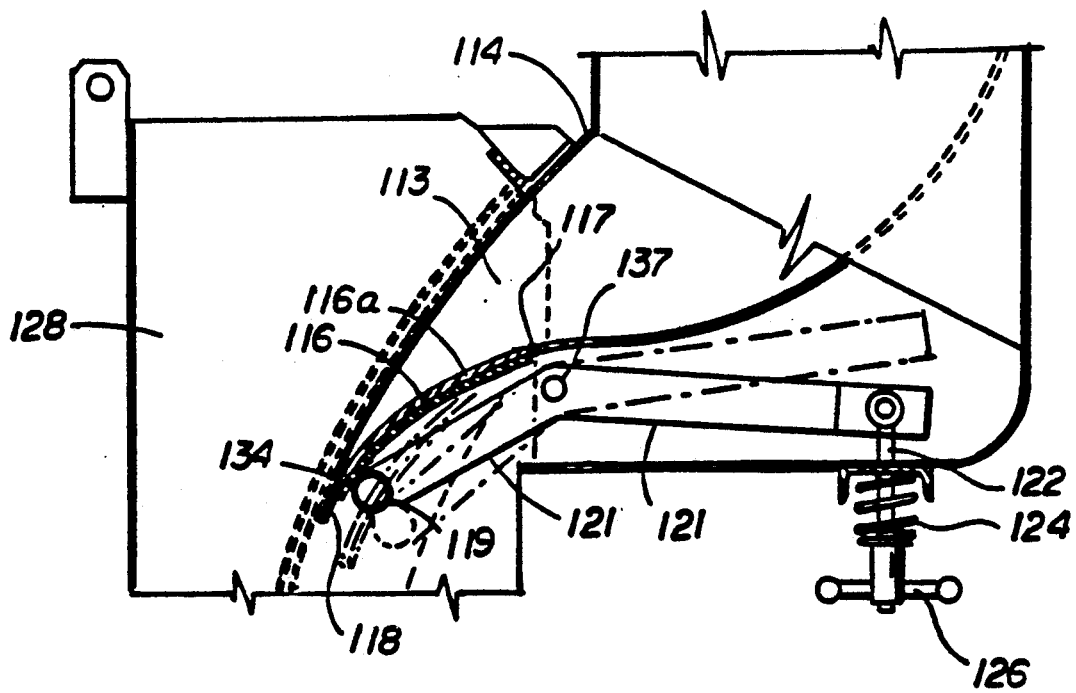
FIG. 8 shows automatic control means for the adjustable throat in the embodiment of FIG. 6.
Figure 9:
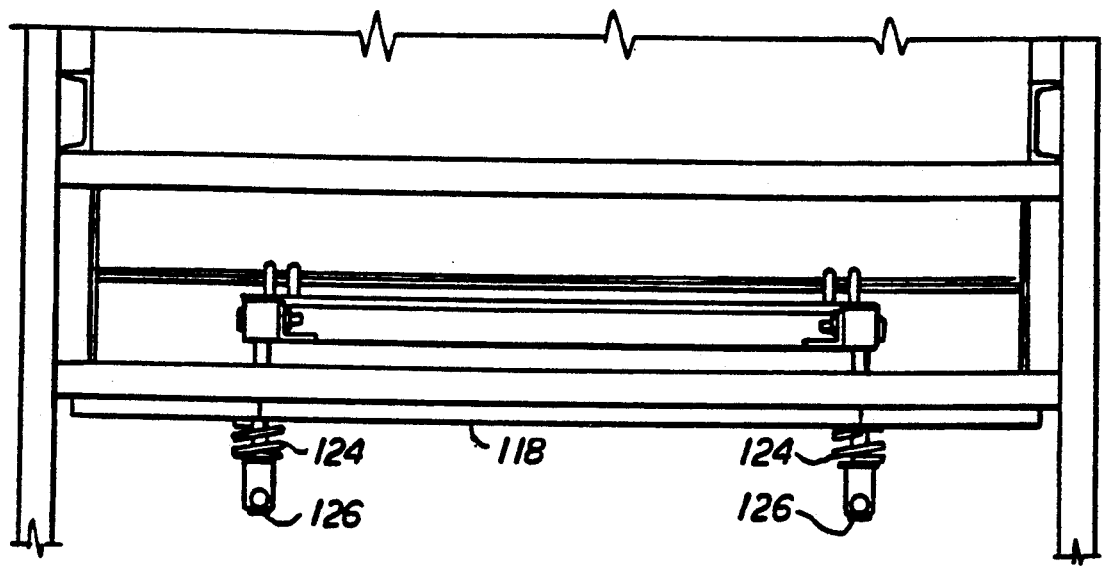
FIG. 9 is a fragmentary front elevational view of the embodiment of FIG. 6.
Figure 10:
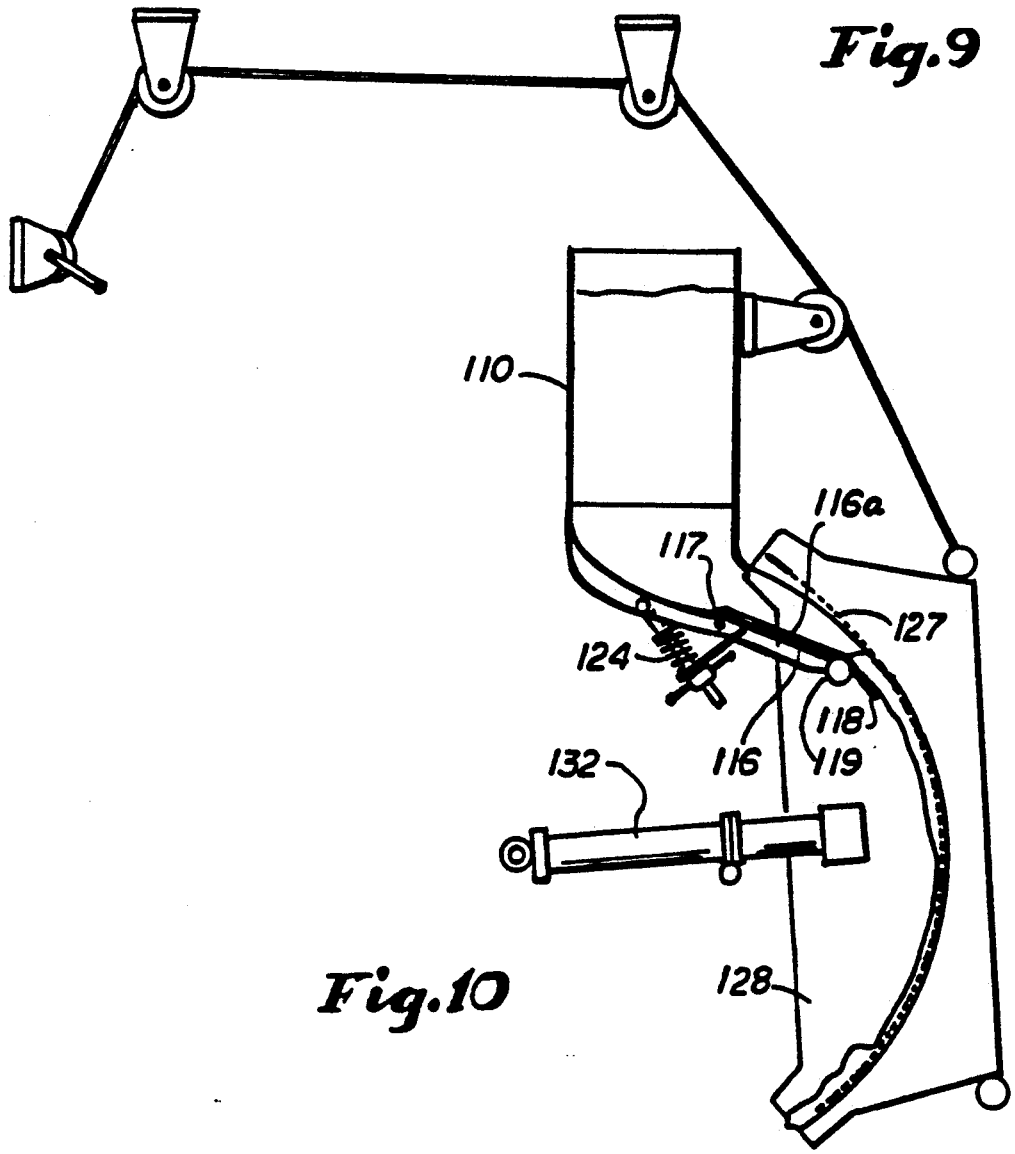
FIG. 10 is a cross-sectional detail showing the relationship between the throat, the pivoted plate and the control flap in the embodiment of FIG. 6.

As illustrated in FIGS. 6-8, a sieve assembly 127 is incorporated in the separator. It is carried by the sieve box 128 and its shape corresponds to the section of a cylinder. It extends the entire width of the separator and it may be termed as corresponding to a bowl. A sieve of the type indicated has spaced bars or wires which extend across the assembly, and are attached to suitable means at their ends. As shown in FIG. 7, normally each wire diverts a layer of slurry through the preceding aperture. This figure shows the cross section of the rods or wires when they are relatively new. At that time the slot between the rods is relatively precise and determines the size of the slurry which passes through the slot. When a rack has had extensive use, a leading edge of a bar will no longer be sharp but will be somewhat rounded. When the flow has been excessive, the wire profile is worn to the point that the slurry essentially passes over the slot. As discussed above in connection with the embodiment of FIGS. 2-3, after one portion of the sieve assembly has been directly subjected to the discharge from the throat, the screen assembly can be moved to present a new part to the discharging slurry, while the major screening operation is taking place. This is also accomplished by the arrangement shown in FIG. 6. The sieve assembly box shown in FIG. 6 is so mounted that it can be moved to present different portions of the sieve assembly to the flow from the throat. As shown particularly in FIG. 6, the sieve assembly is carried by a curved plate 129 which is fixed to the screen box. For the position shown, the slurry from the throat does not impinge upon the upper end portion of the sieve assembly. However, it does function for the intermediate portion of the sieve screen. When it is desired to move that portion of the screen assembly to receive the discharging slurry, the screen box, together with the screen assembly, is rotated a given amount, which directly exposes another portion of the screen assembly to the discharging slurry. To permit such movements, the screen box is carried by the bearing 131 at the extremity of the hinged member 132 of the framework.

A feature of the invention is that operation of the apparatus and particularly flow of slurry through the throat may continue while such adjustments are being made.

An example of the invention is as follows: The bend was constructed with a throat substantially as shown in FIG. 1 or FIG. 6. The feed slurry was one such as produced in the coal industry comprised 5.8% of solid particles dispersed in water. The concentration of solids in the slurry was 2.5% of total coal particles ranging in size from smaller particles about 0.006 to 0.004 inches in diameter to large solids ranging from 0.02 to 0.006 inches diameter. The particles also included about 35.7% of a clay associated mainly with the smaller particles. About 711 gallons of such slurry were pumped through a 2-foot wide, two-stage sieve bend system with plate 73 being adjusted to hold 30 inch static head and appeared to give best performance and capacity. Of the two fractions discharged, the product comprised solids concentrated in a range in size from 0.02 to 0.006 inches in diameter, with about 0.7 to 0.8% of clay particles. The other fraction ranged in size from about 0.006 to 0.0004 inches in diameter and contained about 58% of clay particles.

In the above example, the sieve had a capacity of 365 gallons per minute of slurry per foot of width. In contrast, typical sieve bends being used in the coal industry function at a capacity of only about 100 gallons per minute per foot of width. Tests with the invention indicate capacity advantages of about three times the conventional sieve bends currently being used in the coal industry.

Various additional elements of the apparatus may be used in conjunction with the screening operation. Pneumatic, electrical or hydraulic tapping devices 141 may be used and mounted upon one wall of the screen box. An operating rod connects with device 141 which vibrates the sieve assembly. The sieve box is shown supported by cable 143 which extends over the sheave 144. By playing out this cable, the screen box may be adjusted to various positions. A structure below the apparatus provides conduits which remove the coarse and fine screen particles.

The embodiments of FIGS. 11-14 are generally similar to the embodiment of FIGS. 6-8, and like reference numerals designate corresponding elements in these figures. In the embodiment of FIG. 11, a flap 151 of rubber or other suitable resilient material is affixed along its upper edge to the lower portion of front wall 152 and cooperates with rear wall 153 to form a discharge opening of adjustable size for the throat. Tubular member or bar 119 engages the outer side of the flap and is carried by control arms for movement toward and away from the rear wall of the throat, with the flap thus being yieldably urged toward a closed position by the combined action of spring 124, control arms 122 and tubular member 119. As in the previous embodiment, the compression of the spring and, hence, the force with which the flap is urged toward the closed position can be adjusted by means of hand nut 126.

In the embodiment of FIG. 11, means is also provided for clearing the throat assembly of larger debris which might otherwise cause plugging problems. Such problems are typically associated with fine and ultrafine particle systems, such as fine coal, which require separation and dewatering in sieve bends. The debris may accumulate during shutdown or during normal operation of the sieve. The means for clearing the debris from the throat assembly includes a pair of pneumatic operating cylinders 156 which are connected between brackets 157 affixed to the frame of the throat structure and brackets 158 affixed to the control arms. Actuation of the cylinders rotates the control arms in a counterclockwise direction as viewed in FIG. 11, moving tubular member or bar 119 and flap 151 away from rear wall 153, thereby opening the throat assembly against the force of springs 124.

Cylinders 156 can be controlled manually, automatically or by any other suitable means. Manual operation permits debris to be cleared from the throat assembly at any time during the operation of sieve bend, and automatic operation permits debris to be cleared periodically or whenever the need to do so is detected. In the embodiment illustrated, a start up sensor 161 and a timer 162 actuate the cylinders to open the throat assembly momentarily each time the system is started up to clear any large debris which has accumulated while the system is shut down. In response to a signal from the start up sensor, the timer applies a pneumatic pulse to the cylinders to actuate them for a time sufficient for the accumulated debris to be dislodged by the incoming flow, typically a few seconds.

In the embodiment illustrated in FIG. 13, a secondary repulping box 163 is mounted on the sieve box 128 about midway down the screen for adding liquid to the slurry to improve separation over the lower half of the screen. The repulping box extends the full width of the screen and has a throat 164 similar to throat 113. The repulping box includes a water inlet 166, an outwardly convex rear wall 167, an outwardly convex front wall 168, and an outwardly concave plate 169 hingedly connected to the lower portion of the front wall to form an adjustable discharge opening. A flap 171 of rubber or other resilient material lines the inner side of plate 169 and extends beyond the lower end of the plate as in the main throat assembly. A transversely extending rod or bar 172 mounted on pivotally mounted control arms 173 engages the outer side of plate 169 to adjust the size of the discharge opening.

In operation, clarified water under system pressure is supplied to the repulping box through inlet 166. This water is discharged from the box at high velocity onto the surface of the sieve screen in a direction generally tangential to the screen. This water increases the velocity of the slurry over the lower half of the screen, significantly improving the sizing and dewatering of fine and ultrafine particle systems such as fine coal slurries. The repulping box acts as a second stage of sizing and provides the benefits of a two-stage system without requiring a complete second stage sieve bend.

In the embodiment illustrated in FIG. 14, a vibrator or rapper 176 similar to rapper 141 is mounted on a pivoted arm assembly, with a pivot B attached to the back of the head box and the rapper resting against the support rods of the screen. A strip of elastomeric material runs nearly the full width of the screen between the rapper and the bars to cushion the energy imparted to the screen to ensure that the action of the rapper does not harm the screen.

Rapper 176 is actuated with pressurized air from a pneumatic oscillator 177 at a rate which produces a resonance in the sieve assembly, typically on the order of 100-400 cycles or strokes per minute. The oscillator is preferably made adjustable to permit the stroke rate to be adjusted for the best resonance.

Unlike the action of the intermittent rapping action of rapper 141, rapper 176 operates continuously to provide a constant resonance of vibration which is imparted to the screen. As the vibration energy travels down the screen, the resonance changes and provides supplemental action to the screen, which further assists sizing and dewatering. In addition, since the resonance is supplied by a component that merely rests on the screen and is not mechanically attached, the rapper improves screen performance damaging the screen in the manner characteristic of a continuously operated vibrator or rapper which is mechanically attached to a screen.

The embodiment of FIG. 15 is similar to the embodiment of FIG. 11, with a throat control plate 180 pivotally mounted for movement about an axis 178 and pneumatic actuators or cylinders 179 for moving the plate between normal and open positions. Under normal operating conditions, the cylinders are supplied with pressurized air which holds them in an extended position, with the inner section of control plate 180 in the normal position. The application of air to the cylinders is controlled by an electrically energized solenoid 181. To clear the throat, the air supply is cut off, and internal springs in the actuators retract the cylinder shafts 182, which opens the throat to clear the throat of accumulated debris.

The embodiment of FIG. 15 has the advantage of not requiring compression of control springs to initiate clearing of the throat. In addition, since the pneumatic actuators 179 have no mechanical movement in common with springs 124, the drag of the pistons in the actuators do not influence the response of such springs with changes in slurry static head pressure.

FIG. 16 illustrates another technique for clearing debris from the throat. In this embodiment, the fixed bar 119 of the embodiment of FIG. 11 is replaced with a roller or cylinder 183 which is journalled for rotation about an axis 184, with a plurality of longitudinally extending ribs 185 on the surface of the roller. Any suitable number of ribs can be provided, and the embodiment illustrated, there are six ribs which are spaced 60° apart. The roller is driven at a desired speed by a gear motor 186 which can be actuated in any suitable manner, e.g. electrically, pneumatically or hydraulically.

The ribbed roller cooperates with an elastomeric throat flap 116a at the orifice of throat 187 to provide a paristolic action for clearing the throat. As illustrated in FIG. 17, as roller 183 rotates, ribs 185 present themselves to the elastomeric throat flap, and the flap can conform to the ribbed profile of the roller. If a larger particle becomes lodged in the orifice, it will cause the flap to deflect into the area between two of the ribs, and the particle will be carried through the orifice as the roller turns.

In the embodiment of FIGS. 18-19, the lower head box is provided with vanes 188 which prevent coarser sized particles from entering the throat at the sides of the opening. The vanes are positioned toward the side margins of the throat opening, and each vane has a front plate 189 with an opening 190 and a rearwardly projecting hood 191.

As the particles in the slurry flow downward in the head box, the larger particles 192, which have higher settling velocities than smaller particles, fall to the bottom, as indicated by arrow 193. Since plates 189 prevent particles from entering the margins of the head box except through the hooded openings 190, the larger particles which reside at the bottom of the box can only discharge through the central region of the throat. Smaller particles, which have higher drag forces, tend to follow the water and can therefore pass through the hooded openings and discharge at the sides of the throat opening. Keeping the coarser particles out of the sides of the throat opening ensures that such particles will not get wedged in the tapered openings at the sides of the throat opening.

In the embodiment of FIGS. 20-21, a pair of cyclone separators 196, 201 are mounted in the head box to remove oversize particles before they enter the head box and cause plugging of the throat. Cyclone 196 has an involute or tangential feed 197 through which the slurry is introduced, a tangential outlet 198, and a vortex finder 199 disposed coaxially of the cyclone chamber. As the feed enters the cyclone chamber centrifugal forces cause the coarser particles with their greater mass to migrate toward the outer wall and to exit through the tangential outlet. The finer particles with their higher drag forces tend to follow the path of the majority of the water and to exit through the vortex finder. These particles then pass through a discharge launder 200 and are directed into the distribution box 111 of the head box.

The coarser particles pass to the second cyclone 201, which reduces the velocity and flow of the particles and discharges a slurry containing the particles to a screen 202 which reduces the majority of the remaining water and directs it back into the head box via the path indicated by arrow 203.

In addition to removing coarser particles before they enter the head box and cause plugging of the throat, the embodiment of FIGS. 20-21 also has an additional advantage over a screen in that a screen bind with certain shaped particles.

FIG. 22 illustrates an embodiment in which the screen assembly 127 is supported by an I-beam pedestal 206 which is guided by rollers 207 for movement in an axial direction. The I-beam is moved between raised and lowered positions by a hydraulic jack 208.

As illustrated in FIG. 23, when the jack is retracted, the pedestal is lowered and the screen box 128 moves in a downward direction relative to the throat assembly, exposing a different portion of the screen to the slurry.

The screen assembly can also be positioned horizontally and rotated about a vertical axis 211, as illustrated in FIG. 24. A hollow shaft 212 on the screen box is journalled for rotation in a bearing assembly 213, and when the screen assembly is moved to a horizontal position, the bearing assembly is received in a relief opening 214 in the end plate 216 of the pedestal. In this embodiment, rapper 141 is located within the hollow shaft of the screen box and is thus received in the relief opening so it will not interfere with the rotation of the screen assembly.

It is apparent from the foregoing that a new and improved separating apparatus and method have been provided. While only certain presently preferred embodiments have been described in detail, as will be apparent to those familiar with the art, certain changes and modifications can be made without departing from the scope of the invention as defined by the following claims.

I claim:

1. In apparatus of the bend type for separating solid particles from a liquid slurry: a bend structure defining a passage having an inlet end and a discharge end, a throat of decreasing cross sectional area at the discharge end of the passage formed in part by a movable member, means for adjusting the position of the movable member to vary the cross sectional area of the throat, means for temporarily moving the movable member to an open position to clear debris from the throat, a sieve screen mounted in a housing associated with the bend structure for receiving slurry flowing through the throat from the discharge end of the passage, means for vibrating the housing in a resonant manner, and a repulping box positioned midway along the screen for supplying additional liquid to the slurry as it passes over the screen.

2. The apparatus of claim 1 wherein the movable member comprises a hingedly mounted depending flap, the means for adjusting the position of the movable member includes a control arm, and the means for temporarily moving the movable member to an open position comprises a pneumatic cylinder operably connected to the control arm.

3. The apparatus of claim 1 including means for actuating the means for moving the movable member to the open position for a brief period of time each time operation of the apparatus is begun.

4. The apparatus of claim 1 wherein the means for vibrating the housing includes a rapper mounted on the housing and means for actuating the rapper at a rate which produces a resonant vibration in the housing.

5. The apparatus of claim 4 wherein the means for actuating the rapper includes means for actuating the rapper at a rate of 3-7 strokes per minute.

6. The apparatus of claim 1 wherein the repulping box has a throat of decreasing cross sectional area oriented for discharging the additional liquid onto the screen in a generally tangential direction.

7. In apparatus of the bend type for separating solid particles from a liquid slurry: a bend structure defining a passage having an inlet end and a discharge end, a throat of decreasing cross sectional area at the discharge end of the passage formed in part by a member which can be moved to vary the cross sectional area of the throat, means yieldably urging the movable member toward a closed position, a pneumatic actuator operably connected to the movable member for temporarily moving the member to an open position to clear debris from the throat, and a sieve screen positioned for receiving slurry from the discharge end of the passage.

8. The apparatus of claim 7 including means responsive to start up of the apparatus for actuating the pneumatic actuator for a brief period of time to clear debris which may accumulate in the throat while the apparatus is shut down.

9. In apparatus of the bend type for separating solid particles from a liquid slurry: a bend structure defining a passage having an inlet end and a discharge end, a throat of decreasing cross sectional area at the discharge end of the passage, a sieve screen positioned for receiving slurry from the discharge end of the passage, and a repulping box positioned midway along the screen for supplying additional liquid to the slurry as it passes over the screen.

10. The apparatus of claim 9 wherein the repulping box has a throat of decreasing cross sectional area oriented for discharging the additional liquid onto the screen in a generally tangential direction.

11. In apparatus of the bend type for separating solid particles from a liquid slurry: a bend structure defining a passage having an inlet end and a discharge end, a throat of decreasing cross sectional area at the discharge end of the passage, a sieve screen mounted in a housing associated with the bend structure for receiving slurry flowing through the throat from the discharge end of the passage, and means for vibrating the housing in a resonant manner.

12. The apparatus of claim 11 wherein the means for vibrating the housing includes a vibrator mounted on the housing, and means for actuating the vibrator at a rate which produces a resonant vibration in the housing.

13. The apparatus of claim 12 wherein the means for actuating the vibrator includes means for actuating the vibrator at a rate on the order of 3-7 strokes per minute.

* * * * *